US011920572B2

(12) United States Patent
Fendler et al.

(10) Patent No.: US 11,920,572 B2
(45) Date of Patent: Mar. 5, 2024

(54) CONTROL VALVE AND PROPULSION DEVICE

(71) Applicant: L'Air Liquide, Societe Anonyme pour l'Etude et l'Exploitation des Procedes Georges Claude, Paris (FR)

(72) Inventors: Yoann Fendler, Sassenage (FR); Simon Carpentier, Sassenage (FR); Gérald Fruh, Sassenage (FR); Daniel Viard, Sassenage (FR); Francois Martin, Sassenage (FR)

(73) Assignee: L'Air Liquide Societe Anonyme Pour L'Etude Et L'Exploitation Des Procedes Claude, Paris (FR)

( * ) Notice: Subject to any disclaimer, the term of this patent is extended or adjusted under 35 U.S.C. 154(b) by 0 days.

(21) Appl. No.: 17/826,752

(22) Filed: May 27, 2022

(65) Prior Publication Data
US 2022/0381231 A1    Dec. 1, 2022

(30) Foreign Application Priority Data

May 31, 2021 (FR) ...................... 2105651

(51) Int. Cl.
F16K 1/14 (2006.01)
B64G 1/40 (2006.01)
(Continued)

(52) U.S. Cl.
CPC ............... F03H 1/00 (2013.01); B64G 1/405 (2013.01); F16K 1/14 (2013.01); F16K 1/301 (2013.01);
(Continued)

(58) Field of Classification Search
CPC ... F16K 1/14; F16K 1/301; F16K 1/36; F16K 31/002; F16K 31/025; G05D 7/0635; B64G 1/402; B64G 1/405; F03H 1/00
See application file for complete search history.

(56) References Cited

U.S. PATENT DOCUMENTS

| 2,841,167 A * | 7/1958 | Jacobson ................. F16K 1/14 251/222 |
| 5,100,099 A | 3/1992 | D'Agostino et al. |
| 8,684,036 B1 * | 4/2014 | Satoda ................. F16K 27/029 137/625.33 |
| 2005/0104301 A1 * | 5/2005 | Carter ................. F16K 31/0665 277/530 |

FOREIGN PATENT DOCUMENTS

| FR | 402 004 | 9/1909 |
| FR | 1 120 497 | 7/1956 |
| (Continued) | | |

OTHER PUBLICATIONS

Search Report for FR 2 105 651, dated Feb. 16, 2022.

Primary Examiner — Marina A Tietjen
(74) Attorney, Agent, or Firm — Justin K. Murray

(57) ABSTRACT

Fluid flow control valve comprising a tubular body extending in a longitudinal direction with a fluid inlet and a fluid outlet situated respectively at the two longitudinal ends of the body, the valve comprising a nozzle and a piston connected to the body, the piston being housed in the body, the nozzle being made up of a part provided with a fluid passage having a calibrated dimension, the passage emerging at one end of the nozzle and forming a seat, said seat being situated against a terminal end of the piston forming a shutter preventing the flow of fluid in the closed position of the valve, the piston comprising a body defining a passage for the fluid in the body for the flow of the fluid between the inlet and the outlet, the body of the valve consisting of a
(Continued)

material having a different expansion coefficient from the piston or the nozzle, the valve comprising a heating member which, depending on the heating power delivered, makes it possible to separate the end of the nozzle and the piston by differential expansion, to allow the flow of fluid between the inlet and the outlet in an open position of the valve, characterized in that the terminal end of the piston comprises a ball that is crimped into the body of the piston.

7 Claims, 1 Drawing Sheet

(51) Int. Cl.
*F03H 1/00* (2006.01)
*F16K 1/30* (2006.01)
*F16K 1/36* (2006.01)
*F16K 31/00* (2006.01)
*F16K 31/02* (2006.01)

(52) U.S. Cl.
CPC .............. *F16K 1/36* (2013.01); *F16K 31/002* (2013.01); *F16K 31/025* (2013.01)

(56) References Cited

FOREIGN PATENT DOCUMENTS

| FR | 3 069 899 | | 2/2019 | |
|---|---|---|---|---|
| GB | 1129220 | A * | 10/1968 | |
| GB | 2464954 | A * | 5/2010 | ............. F16K 1/123 |
| JP | S57 35570 | U | 2/1982 | |
| WO | WO 2001/011437 | | 2/2001 | |

\* cited by examiner

CONTROL VALVE AND PROPULSION DEVICE

CROSS-REFERENCE TO RELATED APPLICATIONS

This application claims the benefit of priority under 35 U.S.C. § 119 (a) and (b) to French patent application No. FR 2105651, filed May 31, 2021, the entire contents of which are incorporated herein by reference.

BACKGROUND

Field of the Invention

The invention relates to a control valve and a propulsion device.

The invention relates more particularly to a fluid flow control valve comprising a tubular body extending in a longitudinal direction with a fluid inlet and a fluid outlet situated respectively at the two longitudinal ends of the body, the valve comprising a nozzle and a piston connected to the body, the piston being housed in the body, the nozzle being made up of a part provided with a fluid passage having a calibrated dimension, the passage emerging at one end of the nozzle and forming a seat, said seat being situated against a terminal end of the piston forming a shutter preventing the flow of fluid in the closed position of the valve, the piston comprising a body defining a passage for the fluid in the body for the flow of the fluid between the inlet and the outlet, the body of the valve consisting of a material having a different expansion coefficient from the piston or the nozzle, the valve comprising a heating member which, depending on the heating power delivered, makes it possible to separate the end of the nozzle and the piston by differential expansion, to allow the flow of fluid between the inlet and the outlet in an open position of the valve.

The invention particularly relates to any type of valve operating on the principle of opening (or closing) by different thermal expansion of the internal parts and the body of the valve.

Related Art

WO2001/011437A1 relates to a valve with a symmetrical design having two nozzles situated on either side of a nozzle closing sapphire. FR3069899A1 describes another single-nozzle valve.

The known solutions can have drawbacks, including:
a structure that requires a large number of parts,
the need for surface treatment of the parts,
retention of the sapphire ball that is difficult to repeat accurately (risk of deformation of the tubes, loss of reliability, etc.).

The solutions are thus not entirely satisfactory, particularly in terms of the repeatability of their features and the accuracy of the control obtained.

SUMMARY OF THE INVENTION

One aim of the present invention is to overcome all or some of the drawbacks of the prior art set out above.

To this end, the valve according to the invention, which also meets the generic definition given in the preamble above, is essentially characterized in that the terminal end of the piston comprises a ball that is crimped into the body of the piston, the body of the piston comprising a tubular portion one end of which is crimped around the ball, the tubular portion comprising longitudinal grooves emerging at the end crimped around the ball, said grooves defining longitudinal retaining tabs that are folded around the ball, said grooves being configured to allow the passage of the fluid when the valve is in the open position.

Furthermore, embodiments of the invention can comprise one or more of the following features:
the ball and the nozzle are made from materials configured to ensure a seal between them when the valve is in the closed position,
the ball is made from sapphire,
the valve comprises a single nozzle,
the passage for the fluid defined by the piston comprises a gap between the piston and the body and/or a passage through the body of the piston and/or a passage between the body of the piston and the ball.

A sapphire ball makes it possible, when it is compressed on the piston (in particular if the piston is made from metal), to caulk the piston and therefore ensure satisfactory sealing of the valve when it is in the closed position.

The invention also relates to a propulsion device for a spacecraft comprising a plasma engine, a tank for pressurized gas, in particular xenon or krypton, and a fluid circuit connecting the tank to the engine, the circuit comprising a control valve according to any one of the features above or below.

The invention can also relate to any alternative device or method comprising any combination of the features above or below within the scope of the claims.

BRIEF DESCRIPTION OF THE FIGURES

Further specific features and advantages will become apparent upon reading the following description, which is given with reference to the figures, in which.

DETAILED DESCRIPTION OF THE INVENTION

Figure 1:
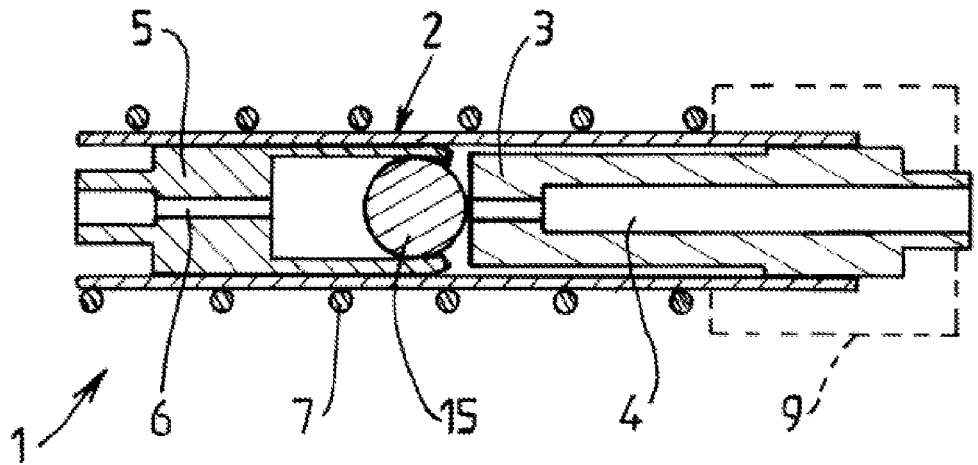
FIG. 1 shows a partial schematic view in cross-section of an exemplary embodiment of a valve according the invention.
Figure 2:
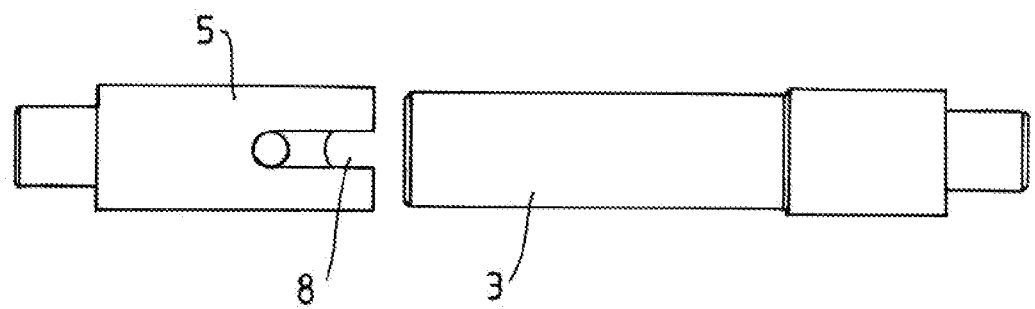
FIG. 2 shows a partial schematic side view of part of the aforementioned exemplary embodiment in an unassembled position and from a viewpoint at 90° to the section plane in FIG. 1.

The fluid flow control valve 1 illustrated comprises a tubular body 2 (for example made from metal) defining a fluid inlet and a fluid outlet situated respectively at the two longitudinal ends of the body 2.

Conventionally, the inlet and outlet can be connected to respective capillary ducts (not shown) for transporting the fluid.

The valve 1 comprises a single nozzle 3 and a piston 5 connected to the body 2.

The piston 5 is housed in the body 2, for example fitted and sealably welded in the body 2.

The nozzle 3 can consist for example of a tubular part provided with a fluid passage 4 having a calibrated dimension (determined calibrated orifice) emerging at one end of the nozzle 3 and forming a seat.

This seat is situated against one end of the piston 5, 15 that forms a sealed shutter preventing the flow of fluid between the inlet and outlet.

Conventionally, the body 2 consists of a material having a different expansion coefficient from the piston 5 and/or the nozzle 3.

The valve 1 further comprises a heating member 7 that, depending on the heating power delivered, makes it possible to separate the end of the nozzle 3 and the piston 5 by differential expansion, to allow the flow of fluid between the inlet and the outlet. In addition, said grooves 8 make it possible to guarantee the flow of the fluid between the inlet and the outlet when the valve is in the open position.

The heating member 7 is for example a heating wire wound around the body 2.

The piston 5 defines a passage 6 for the fluid in the body 2 between the inlet and the outlet for the flow of the fluid between the inlet and the outlet.

According to an advantageous specific feature, the terminal end of the piston 5 comprises a ball 15 crimped at one end of the body of the piston 5.

As illustrated, the body of the piston 5 can comprise a tubular portion one end of which is crimped around the ball 15. For example, the tubular portion comprises longitudinal grooves 8 emerging at the end crimped around the ball 15. Said grooves 8 define longitudinal retaining tabs or lips that are crimped (folded) around the ball 15.

This crimping of the ball 15 can be carried out repeatably on an industrial scale in a piston 5 machined for crimping (lips designed to be folded). This makes it possible to carry out the crimping with the body of the piston 5 instead of via the deformation of the body 2 of the valve.

This can be carried out by a specific mechanical tool. This makes the performance of the valve 1 more repeatable from one valve to another (opening temperature/electrical power). Pre-stressing is applied to the assembly of the valve between the nozzle 3 and the piston 5, 15 so that the ball 15 is compressed on the nozzle 3, thus guaranteeing the sealing of the system. This mechanical pre-stressing can be modified in order to modify the opening temperature of the valve.

The surface deposition or treatment applied in the known solutions in order to guarantee satisfactory sealing can be eliminated, without any deterioration in performance.

In the non-limiting example illustrated, the valve 1 is asymmetrical (the valve opens on one side only, that is, there is only one sealing seat). Of course, other configurations are possible.

In addition, the ball 15 (preferably made from sapphire) could be replaced by a part having a spherical or convex or other portion allowing this sealed closure against the seat.

The valve 1 can also comprise a nut 9 fastened on the body 2 and retaining the nozzle 3 or the piston 5 in the body 2.

Likewise, as illustrated, the nozzle 3 can be fitted into the body 2 and the nut 9 can be mounted on the nozzle 3 and on the body 2 and retain the nozzle 3 in the body 2. The nut 9 can particularly be welded onto the body 2 and/or onto the nozzle 3. The closed position of the valve (contact force of the ball 15 on the seat) can be defined by the tightening position of the nut 9 on the body 2.

The invention has a number of advantages. The valve can particularly be used at pressures of up to 700 bar and 400 bar in accordance with space-related standards. The repeatability of the product is improved (guaranteed uniformity of performance and features when multiple items are produced).

The male threaded outlet on a single side of the valve makes it easier to incorporate/assemble it in the receiving system.

In addition, improved control of the valve opening temperatures is obtained.

Figure 3:
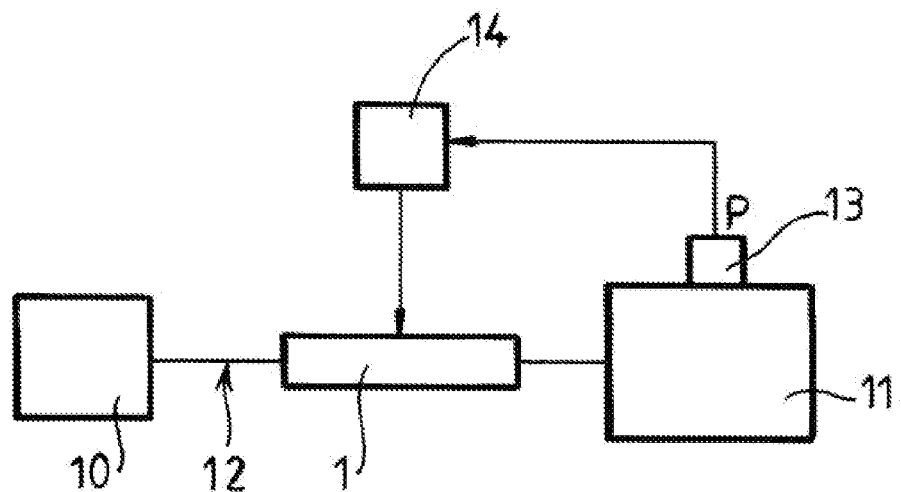
FIG. 3 shows a partial schematic view of an exemplary use of such a valve in a propulsion device.

As illustrated in FIG. 3, the valve 1 can be used in a propulsion device for a spacecraft comprising a plasma engine 11 and a tank 10 of pressurized gas, in particular xenon or krypton. The valve 1 is situated in a fluid circuit 12 connected to the tank 10 and the plasma engine 11. The device can comprise a sensor 13 for measuring an operating parameter P of the engine (in particular, for example, the pressure of the fluid upstream of the engine or the discharge current of the engine) and an electronic member 14 for regulating and controlling the control valve 1 as a function of this operating parameter. The electronic member 14 for regulating and controlling the valve 1 (comprising a microprocessor, for example) can particularly be configured to regulate the heating power of the heating member 7 (opening/closing of the valve 1) as a function of the operating parameter P.

The ball could be replaced by a part comprising a spherical portion.

While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fail within the spirit and broad scope of the appended claims. The present invention may suitably comprise, consist or consist essentially of the elements disclosed and may be practiced in the absence of an element not disclosed. Furthermore, if there is language referring to order, such as first and second, it should be understood in an exemplary sense and not in a limiting sense. For example, it can be recognized by those skilled in the art that certain steps can be combined into a single step.

The singular forms "a", "an" and "the" include plural referents, unless the context dearly dictates otherwise.

"Comprising" in a claim is an open transitional term which means the subsequently identified claim elements are a nonexclusive listing i.e. anything else may be additionally included and remain within the scope of "comprising." "Comprising" is defined herein as necessarily encompassing the more limited transitional terms "consisting essentially of" and "consisting of"; "comprising" may therefore be replaced by "consisting essentially of" or "consisting of" and remain within the expressly defined scope of "comprising".

"Providing" in a claim is defined to mean furnishing, supplying, making available, or preparing something. The step may be performed by any actor in the absence of express language in the claim to the contrary.

Optional or optionally means that the subsequently described event or circumstances may or may not occur. The description includes instances where the event or circumstance occurs and instances where it does not occur.

Ranges may be expressed herein as from about one particular value, and/or to about another particular value. When such a range is expressed, it is to be understood that another embodiment is from the one particular value and/or to the other particular value, along with all combinations within said range.

All references identified herein are each hereby incorporated by reference into this application in their entireties, as well as for the specific information for which each is cited.

What is claimed is:

1. A fluid flow control valve comprising: a tubular body extending in a longitudinal direction with a fluid inlet and a fluid outlet situated respectively at the two longitudinal ends of the body; a nozzle having an expansion coefficient different from a material that the tubular body consists of; a piston connected to the body having an expansion coefficient different from the material that the tubular body consists of and comprising a body defining a passage for the fluid in the body for the flow of the fluid between the inlet and the outlet and also a ball at a terminal end of the piston that is crimped into the body of the piston; and a heating member which, depending on the heating power delivered, makes it possible to separate the end of the nozzle and the piston by differential expansion, to allow the flow of fluid between the inlet and the outlet in an open position of the valve, wherein:

the piston is housed in the body;

the nozzle is made up of a part provided with a fluid passage having a calibrated dimension, the fluid passage of the nozzle emerging at one end of the nozzle and forming a seat, said seat being situated against a terminal end of the piston forming a shutter preventing the flow of fluid in the closed position of the valve;

the body of the piston comprises a tubular portion one end of which is crimped around the ball; and the tubular portion comprises longitudinal grooves emerging at the end crimped around the ball, said grooves defining longitudinal retaining tabs that are folded around the ball and being configured to allow the passage of the fluid when the valve is in the open position.

2. The valve of claim 1, wherein the ball and the nozzle are made from materials configured to ensure a seal between them when the valve is in the closed position through the sealed closure of the ball against the seat formed by the nozzle.

3. The valve of claim 1, wherein the ball is made from sapphire.

4. The valve of claim 1, wherein the valve comprises a single nozzle.

5. The valve of claim 1, wherein the passage for the fluid defined by the piston comprises a gap between the piston and the body and/or a passage through the body of the piston and/or a passage between the body of the piston and the ball.

6. A propulsion device for a spacecraft comprising:

a plasma engine;

a tank for pressurized gas; and a fluid circuit connecting the tank to the engine and comprising the control valve of claim 1.

7. The propulsion device of claim 6, wherein the pressurized gas is xenon or krypton.

* * * * *